United States Patent
Hwang et al.

(10) Patent No.: US 7,068,425 B2
(45) Date of Patent: Jun. 27, 2006

(54) WIDEBAND OPTICAL FIBER AMPLIFIER

(75) Inventors: Seong-Taek Hwang, Pyongtaek-shi (KR); Kwan-Woong Song, Songnam-shi (KR); Yun-Je Oh, Yongin-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 299 days.

(21) Appl. No.: 10/648,664

(22) Filed: Aug. 26, 2003

(65) Prior Publication Data

US 2004/0212873 A1 Oct. 28, 2004

(30) Foreign Application Priority Data

Sep. 18, 2002 (KR) ............. 10-2002-0056984

(51) Int. Cl.
*H01S 3/00* (2006.01)
(52) U.S. Cl. ................. 359/349; 359/341.32
(58) Field of Classification Search ........... 359/349, 359/341.32
See application file for complete search history.

(56) References Cited

U.S. PATENT DOCUMENTS

| | | | |
|---|---|---|---|
| 6,304,370 B1 * | 10/2001 | Barnard | 359/341.1 |
| 6,307,688 B1 * | 10/2001 | Merz et al. | 359/819 |
| 6,437,907 B1 * | 8/2002 | Yoon et al. | 359/341.32 |
| 6,535,324 B1 * | 3/2003 | Hwang et al. | 359/283 |
| 6,621,627 B1 * | 9/2003 | Willner et al. | 359/349 |
| 6,646,796 B1 * | 11/2003 | Song et al. | 359/349 |
| 6,674,570 B1 * | 1/2004 | Song et al. | 359/349 |
| 6,867,912 B1 * | 3/2005 | Hwang et al. | 359/349 |
| 6,891,661 B1 * | 5/2005 | Hayashi et al. | 359/334 |
| 6,903,868 B1 * | 6/2005 | Hwang et al. | 359/349 |
| 6,927,898 B1 * | 8/2005 | Yeniay et al. | 359/349 |
| 2003/0035204 A1 * | 2/2003 | Ahn et al. | 359/341.3 |
| 2003/0123141 A1 * | 7/2003 | Yeniay | 359/349 |
| 2003/0179442 A1 * | 9/2003 | Hwang | 359/341.41 |
| 2004/0233516 A1 * | 11/2004 | Hwang et al. | 359/349 |
| 2004/0233517 A1 * | 11/2004 | Song et al. | 359/349 |
| 2004/0233518 A1 * | 11/2004 | Song et al. | 359/349 |

FOREIGN PATENT DOCUMENTS

| | | | |
|---|---|---|---|
| EP | 1263097 A2 | * | 12/2002 |
| JP | 2002094158 A | * | 3/2002 |
| JP | 2002319726 A | * | 10/2002 |

* cited by examiner

Primary Examiner—Deandra M. Hughes
(74) Attorney, Agent, or Firm—Cha & Reiter, L.L.C.

(57) ABSTRACT

Disclosed wideband optical fiber amplifier amplifies and outputs wideband optical signal containing C-band and L-band optical signals. The amplifier includes: a first amplification section amplifying the wideband optical signals; a second amplification section amplifying the separated L-band optical signals amplified by the first amplification section; an optical signal coupler combining and outputting the optical signals amplified by the first and second amplification sections; and an optical circulator. A first port of the optical circulator inputs the wideband optical signals from the optical communication network; a second port outputs the inputted wideband optical signals and inputs spontaneous emissions generated from the first amplification section; a third port provides the spontaneous emissions to the second amplification section while inputting the L-band optical signals amplified by the second amplification section; and a fourth port outputs L-band optical signals that were inputted to the third port to the optical signal coupler.

6 Claims, 3 Drawing Sheets

WIDEBAND OPTICAL FIBER AMPLIFIER

CLAIM OF PRIORITY

This application claims priority to an application entitled "Wideband Optical Fiber Amplifier" filed in the Korean Intellectual Property Office on Sep. 18, 2002 and assigned Ser. No. 2002-56984, the contents of which are hereby incorporated by reference.

BACKGROUND OF THE INVENTION

1. Field of the Invention

The present invention relates to a wideband optical fiber amplifier. More particularly, the present invention is directed to a wideband optical fiber amplifier for amplifying optical signals transmitted from an optical communication network under a predetermined condition, thereby compensating for a loss of optical signals or a reduction of optical power.

2. Description of the Related Art

A conventional optical fiber amplifier, used in an optical communication system, is a device for amplifying various transmitted optical signals. The optical fiber amplifier amplifies optical signals as they are without photoelectric transformation. This allows for a simple, economical construction. The optical fiber amplifier includes an optical fiber doped with at least one rare-earth element, a pumping diode for generating pumping lights, a wavelength selection coupler for providing combination of transmitted optical signals with the pumping lights to the doped optical fiber, and an optical isolator.

Various rare-earth elements dopes for the optical fiber may be used, e.g., erbium (Er), praseodymium (Pr), neodymium (Nd) and the like.

Optical amplification using the rare-earth element doped optical fiber is carried out through a stimulated emission process. Pumping lights emitted from a pumping diode carry out exciting and ionizing of a rare-earth element doped into optical fiber. As a result, optical signals transmitted into the rare-earth element doped optical fiber are amplified by stimulated emission of the excited ions.

With the gradual increase in the amounts of data transmitted through optical communication systems, the demand to broaden transmission bandwidths of optical communication networks has increased. In response to this demand, wideband optical fiber amplifiers, for a wavelength division multiplex in optical communication systems, which can simultaneously make use of C-band optical signals ranged from 1530 nm to 1560 nm and L-band optical signals ranged from 1570 nm to 1600 nm are commonly employed.

FIG. 1 shows a construction of a conventional wideband optical fiber amplifier 100. The wideband optical fiber amplifier 100 includes a C/L splitter 110, a three-port optical circulator 111, first and second amplification sections 130 and 140, optical isolators 113, 121 and 125, and first and second optical signal couplers 115 and 123.

The C/L splitter 110 separates input wideband optical signals, which have been transmitted from an optical communication network to the wideband optical fiber amplifier 100, into C-band optical signals and L-band optical signals The separated C-band optical signals and L-band optical signals are then transmitted to the first amplification section 130 and the second amplification section 140, respectively.

The three-port optical circulator 111 is provided with a first port, a second port and a third port. The C-band optical signals are received through the first port. The received C-band optical signals are output through the second port to the first amplification section 130The second port may also receive amplified spontaneous emissions (ASEs) which are generated from the first amplification section 130. The received ASEs are output through the third port to the second optical coupler 123. The optical circulator 111 also prevents spontaneous emissions input through the second port or reflected optical signals from being reversely output through the first port, and thus functions as an optical isolator.

The first amplification section 130 includes a first pumping diode 131, a first wavelength selection coupler 132 and a rare-earth element doped optical fiber 133, acting to amplify the C-band optical signals inputted from the optical circulator 111. Pumping lights generated from the first pumping diode 131 are combined with the C-band optical signals at the first wavelength selection coupler 132 and then input into the rare-earth element doped optical fiber 133. A rare-earth element doped into the rare-earth element doped optical fiber 133 is excited by the pumping lights and then amplifies the C-band optical signals under a stimulated emission. The first pumping diode 131 may use a laser diode that outputs pumping lights having a wavelength band of about 980 nm or 1480 nm. Spontaneous emission generated during an optical signal amplification of the first amplification section 130 are input into the second port of the optical circulator 111 and then directed through the third port of the optical circulator 111 to the second amplification section 140. These spontaneous emissions generated from the first amplification section 130 are supplied as pumping lights for the second amplification section 140.

The C-band optical signals amplified by the first amplification section 130 are then input through the optical isolator 113 into the first optical signal coupler 115.

The L-band optical signals separated by the C/L splitter 110 are input through the optical isolator 121 and the second optical signal coupler 123 into the second amplification section 140. The separated L-band optical signals are then amplified by the second amplification section 140.

The second optical coupler 123 combines the separated L-band optical signals with the spontaneous emissions input from the optical circulator 111, and then inputs the combined results into the second amplification section 140. As mentioned above, the spontaneous emissions generated from first amplification section 130 are supplied as pumping lights for the second amplification section 140.

The second amplification section 140 includes second and third pumping diodes 141a and 141b, second and third wavelength selection couplers 143a and 143b, and a rare-earth element doped optical fiber 145, acting to amplify the separated L-band optical signals.

Pumping lights generated from the second and third pumping diodes 141a and 141b are input through each of the wavelength selection couplers 143a and 143b into the rare-earth element doped optical fiber 145. As noted above, the spontaneous emissions generated from the first amplification section 130 are used as pumping lights for amplifying the L-band optical signals. A rare-earth element doped into the rare-earth element doped optical fiber 145 is excited by the pumping lights and then amplifies the L-band optical signals under a stimulated emission. Each of the second and third wavelength couplers 143a and 143b is provided on the corresponding input and output sides of the second amplification section 140, inputting the pumping lights into the rare-earth element doped optical fiber 145 from both sides of the second amplification section 140.

The L-band optical signals amplified by the second amplification section 140 are input through the optical isolator 125 into the first optical signal coupler 115.

The first optical coupler 115 combines the C-band optical signals and the L-band optical signals amplified by each of the fist and second amplification sections 130 and 140, respectively, and then outputs the combined results to the optical communication network (not shown).

However, as mentioned above, since the conventional wideband optical fiber amplifier uses an additional optical signal coupler to separate wideband optical signals input first from the optical communication network into C-band optical signals and L-band optical signals and then to amplify each of the separated two band optical signals, it has various problems. For example, a noise figure as well as an insertion loss is increase. In addition, the cost of manufacture is increased due to the increased number of components to be constructed.

Accordingly, there is an need in the art for an improved optical signal amplification system.

SUMMARY OF THE INVENTION

Accordingly, the present invention has been made to solve the above-mentioned problems occurring in the prior art, and an object of the present invention is to provide a wideband optical fiber amplifier for improving optical signal amplification quality by lowering a noise figure and an insertion loss.

An other object of the present invention is to provide a wideband optical fiber amplifier for saving manufacturing expenses by having a reduced number of constructed components.

In one embodiment, a wideband optical fiber amplifier for amplifying and outputting wideband optical signals is provided, having C-band optical signals and L-band optical signals, which are input from an optical communication network. The amplifier includes;

a first amplification section for amplifying and outputting wideband optical signals consisting of C-band optical signals and L-band optical signals and for outputting amplified spontaneous emissions generated in process of amplifying the wideband optical signals;

a C/L splitter for separating the wideband optical signals amplified by the first amplification section into C-band optical signals and L-band optical signals and then outputting the separated optical signals;

a second amplification section for amplifying and outputting the L-band optical signals outputted form the C/L splitter;

an optical signal coupler for combining the C-band optical signals output from the C/L splitter with the L-band optical signals amplified by the second amplification section and then outputting the combined optical signals; and an optical circulator having a first port for causing the wideband optical signals from the optical communication network to be inputted, a second port for causing the inputted wideband optical signals to be outputted and for causing spontaneous emission generated form the first amplification section to be inputted, a third port for causing the spontaneous emissions to be provided as pumping lights for the second amplification section and for causing the L-band optical signals amplified by the second amplification section to be inputted and a fourth port for causing the L-band optical signals inputted into the third port to be outputted to the optical signal coupler.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described in detail with reference to the accompanying drawings. In the following description of the present invention, a detailed description of known functions and configurations incorporated herein will be omitted when it may make the subject matter of the present invention rather unclear.

Figure 1:
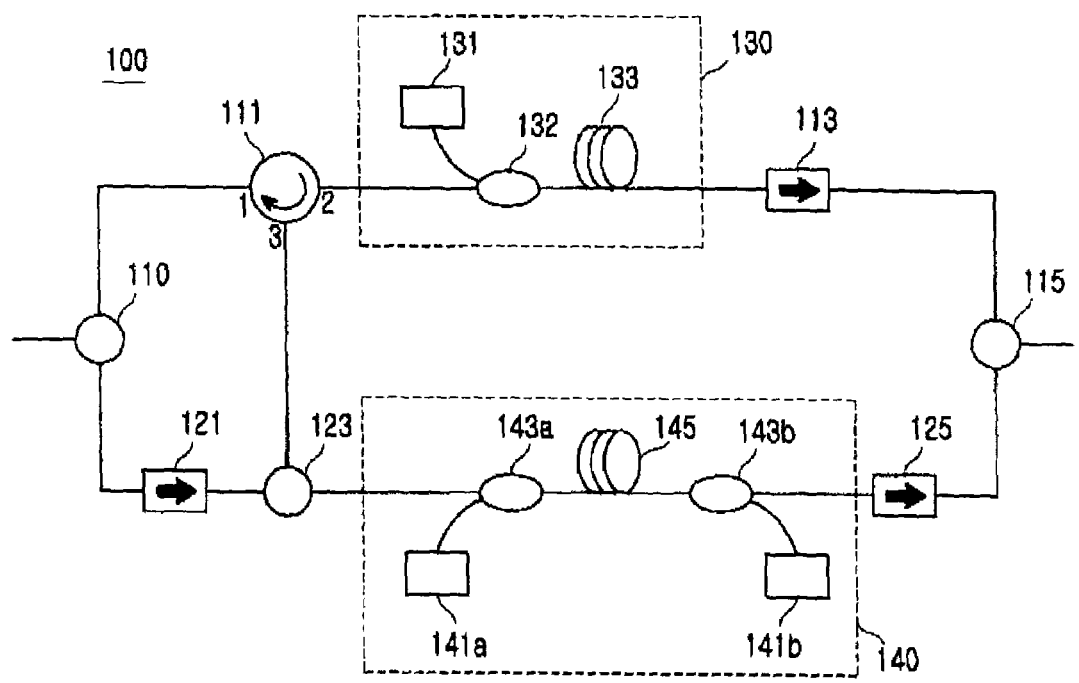
FIG. 1 shows a construction of a conventional wideband optical fiber amplifier.
Figure 2:
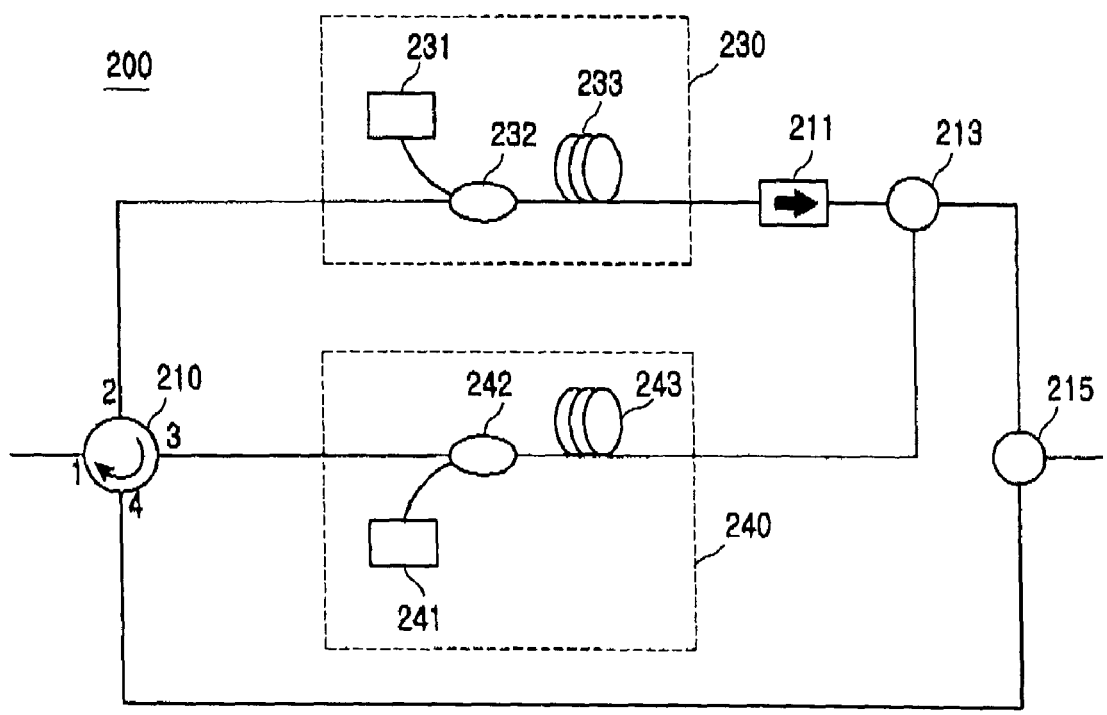
FIG. 2 shows a construction of a wideband optical fiber amplifier according to a first embodiment of the present invention.

FIG. 2 shows a construction of an wideband optical fiber amplifier 200 according to a first embodiment of the present invention. As shown in FIGS. 2, the wideband optical fiber amplifier 200 includes a four-port optical circulator 210, first and second amplification sections 230 and 240, an optical isolator 211, a C/L splitter 213 and an optical signal coupler 215.

The four-port optical circulator 210 has a first port, a second port, a third port and a fourth port. Wideband optical signals input through the first port from an optical communication network (not shown) are output through the second port to the first amplification section 230. The optical circulator 210 also causes amplified spontaneous emissions (ASEs), which are generated in the optical signal amplification process of the first amplification section 230 that are input through the second port, to be output to the third port. L-band optical signals (as discussed below) which are amplified by the second amplification section 240 that are input through the third port to be output to the fourth port. Accordingly, the optical circulator 210 is designed so that wideband optical signals input through the first port are output to the second port, spontaneous emissions input through the second port are output to the third port, and the L-band optical signals input through the third port are output to the fourth port. At the same time, the optical circulator 210 blocks optical signals each of which are transmitted reverse to its advancing direction to reduce amplification efficiency, thereby functioning as an optical isolator.

The first amplification section 230 includes a first pumping diode 231, a first wavelength selection coupler 232 and a rare-earth element doped optical fiber 233, that function to amplify wideband optical signals input from the optical circulator 210. Pumping lights generated from the first pumping diode 231 are combined with the wideband optical signals at the first wavelength selection coupler 232 and then input into the rare-earth element doped optical fiber 233. A rare-earth element doped into the rare-earth element doped optical fiber 133 is excited by the pumping lights and then amplifies the wideband optical signals in process of a stimulated emission. A laser diode which outputs pumping lights having a wavelength of about 980 nm or 1480 mn may be used as the first pumping diode 231 mentioned above, Spontaneous emissions generated in the optical signal amplification process of the first amplification section 230 are input into the second port of the optical circulator 210 and then directed through the third port of the optical circulator 210 to the second amplification section 240. These spontaneous emissions generated from the first amplification section 130 are supplied as pumping lights for the second amplification section 240.

The wideband optical signals amplified by the first amplification section 230 are input through the optical isolator 211 into the C/L splitter 213.

The optical isolator 211 blocks optical signals advancing opposite to the direction in which the wideband optical signals advance between the first amplification section and the C/L splitter 213. For example, the optical isolator 211 allows optical signals input into the second port of the optical isolator 211 to be directed to the third port, but prevents optical signals input into the second port of the optical isolator 211 from being directed to the first port.

The C/L splitter 213 separates amplified optical signals into C-band optical signals and L-band optical signals to output the separated optical signals. The C-band optical signals separated by the C/L splitter 213 are input into the optical signal coupler 215, while the L-band optical signals are input into the second amplification section 240.

The second amplification section 240 includes a second pumping diode 241, a second wavelength selection coupler 242 and a rare-earth element doped optical fiber 243, amplifying the L-band optical signals separated by and inputted from the C/L splitter 213. The spontaneous emissions generated from the first amplification section 230 as well as pumping lights generated from the second pumping diode 241 are input through the second wavelength selection coupler 242 into the rare-earth element doped optical fiber 243. A rare-earth element doped into the rare-earth element doped optical fiber 243 is excited by the spontaneous emissions and the pumping lights, and then amplifies the L-band optical signals in a stimulated emission process. It should be understood that the spontaneous emissions generated from the first amplification section 230 are input into the second amplification section 240 in a direction opposite to that in which the L-band optical signals advance. The pumping lights generated from the second pumping diode 241 are also input in a direction opposite to that in which the L-band optical signals advance. In that regard, the pumping lights input into the rare-earth element doped optical fiber 243 can be input in a direction identical or opposite to the direction in which the amplified optical signals advance. All of the above is also true to the first amplification section 230.

The L-band optical signals amplified by the second amplification section 240 are input into the third port of the optical circulator 210 and then are directed through the fourth port of the optical circulator 210 to the optical signal coupler 215.

The optical signal coupler 215 combines the C-band optical signals and the L-band optical signals amplified by each of the fist and second amplification sections 230 and 240, respectively and then causes the combined results to be outputted to the optical communication network.

Consequently, the wideband optical signals input into the optical circulator 210 are primarily amplified by the first amplification section 230, C-band optical signals and L-band optical signals are separated, and then secondarily amplified by the second amplification section 240. The spontaneous emissions generated from the first amplification section 230 are input through the optical circulator 210 into the second amplification section 240 in a direction opposite to that in which the L-band optical signals advance, thereby acting as pumping lights.

As should be appreciated, the wideband optical fiber amplifier according to first embodiment of the present invention uses the four-port optical circulator, so that the number of components such as the optical signal coupler, the optical isolator, etc., can be decreased.

Figure 3:
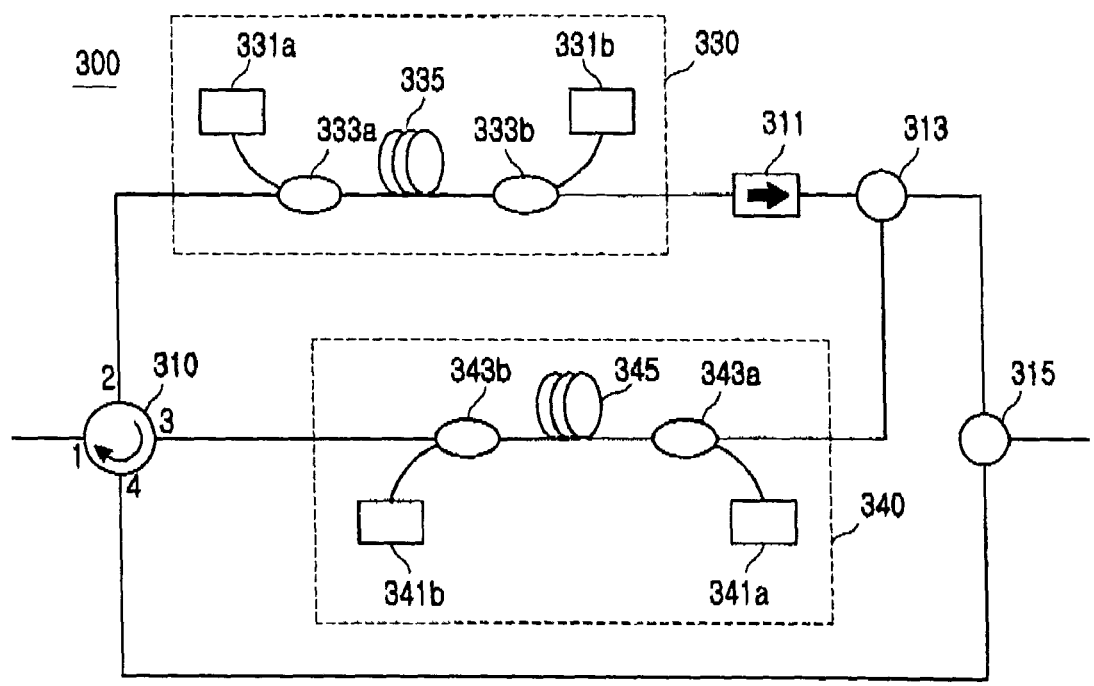
FIG. 3 shows a construction of a wideband optical fiber amplifier according to a second embodiment of the present invention.

FIG. 3 shows a construction of a wideband optical fiber amplifier 300 according to a second embodiment of the present invention. The wideband optical fiber amplifier 300 includes a four-port optical circulator 310, first and second amplification sections 330 and 340, an optical isolator 311, a C/L splitter 313 and an optical signal coupler 315.

With respect to amplification of the wideband optical signals, the wideband optical fiber amplifier 300 according to this embodiment is similar to that of the wideband optical fiber amplifier 200discussed above, in which the wideband optical signals are input into the optical circulator 310, initially amplified by the first amplification section 330, and separated into C-band optical signals and L-band optical signals, and then only L-band optical signals are amplified again by the second amplification section 340. Further, the spontaneous emissions generated from the first amplification section 330 are input through the optical circulator 310 into the second amplification section 340 in a direction opposite to that in which the L-band optical signals advance, thereby acting as pumping lights.

However, the first and second amplification sections 330 and 340 of the second embodiment are different from that of the first embodiment in each construction.

The first amplification section 330 includes first and second pumping diodes 331a and 331b, first and second wavelength selection couplers 333a and 333b and a rare-earth element doped optical fiber 335. The first pumping diode 331a generates pumping lights for amplifying the wideband optical signals input into the first amplification section 330 and supplies the pumping lights to an input side of rare-earth element doped optical fiber 335 via the first wavelength selection coupler 333a. The second pumping diode 331b generates pumping lights for amplifying the wideband optical signals and supplies the pumping lights to an output side of rare-earth element doped optical fiber 335 via the second wavelength selection coupler 333b.

The second amplification section 340 includes third and fourth pumping diodes 341a and 341b, third and fourth wavelength selection couplers 343a and 343b and a rare-earth element doped optical fiber 345. The third pumping diode 341a generates pumping lights for amplifying the wideband optical signals input into the second amplification section 340 and supplies the pumping lights to an input side of the rare-earth element doped optical fiber 345 via the third wavelength selection coupler 343a. The fourth pumping diode 341b generates pumping lights for amplifying the wideband optical signals and supplies the pumping lights to an output side of the rare-earth element doped optical fiber 345 via the fourth wavelength selection coupler 343b. In addition, the second amplification section 340 uses the spontaneous emissions, which are generated from the first amplification section 330 and then input through the optical circulator 310, as pumping lights. On an output side of the second amplification section 340, the spontaneous emissions are input through the third wavelength selection coupler 343b into the rare-earth element doped optical fiber 345.

Referring now to the first embodiment shown in FIG. 2, it should be understood that pumping lights in the first amplification section 230 are input in same direction as the direction of advancement of the optical signals on the input side of the rare-earth element doped optical fiber 233, but pumping lights in the second amplification section 240 are inputted in a direction opposite to the direction of advancement of the optical signals on the output side of the rare-earth element doped optical fiber 233.

Referring now to the second embodiment shown in FIG. 3, it should be understood that pumping lights in the respective first and second amplification sections 330 and 340 are input on the respective input and output sides of the rare-earth element doped optical fibers 335 and 345.

In this regard, it is possible for pumping lights to excite at least one rare-earth element to be input in a direction identical or opposite to the direction of advancement of the optical signals or in both directions. Moreover, when the pumping lights are input in both directions, as in the second embodiment, the optical fiber amplifiers provide an increased amplification output.

As mentioned above, the wideband optical fiber amplifier according to the second embodiment of the present invention not only has a decreased number of components, including the optical signal coupler, the optical isolator, etc., by employment of the four-port optical circulator, but also creates increased output from the optical fiber amplifier by using the bilateral transmission pumping lights.

While the invention has been shown and described with reference to certain preferred embodiments thereof, it will be understood by those skilled in the art that various changes in form and details may be made therein without departing from the spirit and scope of the invention as defined by the appended claims.

As seen form the above, the wideband optical fiber amplifier according to preferred embodiments of the present invention receives wideband optical signals from the optical communication network and at the same time functions as an optical isolator in the process of optical signal amplification using the four-port optical circulator, so that the number of components such as the optical signal coupler, the optical isolator, etc., can be decreased. Therefore, both a noise figure and an insertion loss depending on the use of a plurality of components can be improved, expenses for manufacturing the wideband optical fiber amplifier can be saved, and the dimensions of the wideband optical fiber amplifier can be reduced.

What is claimed is:

1. A wideband optical fiber amplifier for amplifying and outputting wideband optical signals, the wideband optical signal including C-band optical signals and L-band optical signals, comprising;
    a first amplification section for amplifying and outputting the wideband optical signals including the C-band optical signals and the L-band optical signals and for outputting amplified spontaneous emissions generated in a process of amplifying the wideband optical signals;
    a C/L splitter for separating the wideband optical signals amplified by the first amplification section into the C-band optical signals and the L-band optical signals and then outputting separated C-band optical signals and separated L-band optical signals;
    a second amplification section for amplifying and outputting the separated L-band optical signals;
    an optical signal coupler for combining the separated C-band optical signals output from the C/L splitter with the separated L-band optical signals amplified by the second amplification section and then outputting the combined optical signals; and
    an optical circulator having a first port for receiving the wideband optical signals, a second port for causing the wideband optical signals to be output and for causing spontaneous emission generated form the first amplification section to be input, a third port for causing the spontaneous emissions to be provided as pumping lights for the second amplification section and for causing the separated L-band optical signals amplified by the second amplification section to be input and a fourth port for causing the L-band optical signals input into the third port to be output to the optical signal coupler.

2. A wideband optical fiber amplifier according to claim 1, further comprising an optical isolator for blocking optical signals advancing opposite to a direction in which the wideband optical signals advance between the first amplification section and the C/L splitter.

3. A wideband optical fiber amplifier according to claim 1, wherein the first amplification section includes:
    at least one pumping diode for generating pumping lights so as to amplify the wideband optical signals input into the first amplification section;
    a first rare-earth element doped optical fiber, pumped by the pumping lights, for amplifying the wideband optical signals which are input into the first rare-earth element doped optical fiber; and
    a wavelength selection coupler for inputting the pumping lights generated from the at least one pumping diode into the first rare-earth element doped optical fiber on an input side of the first rare-earth element doped optical fiber.

4. A wideband optical fiber amplifier according to claim 1, wherein the second amplification section includes:
    at least one pumping diode for generating pumping lights so as to amplify the separated L-band optical signals input into the second amplification section;
    a second rare-earth element doped optical fiber, pumped by the pumping lights, for amplifying the separated L-band optical signals which input into the second rare-earth element doped optical fiber; and
    a wavelength selection coupler for inputting the pumping lights generated from the at least one pumping diode into the second rare-earth element doped optical fiber on an input side of the second rare-earth element doped optical fiber.

5. A wideband optical fiber amplifier according to claim 1, wherein the wideband optical signals are provided by an optical communication network.

6. A wideband optical fiber amplifier according to claim 1, wherein the combined optical signals are provided to an optical communication network.

* * * * *